US012615196B2

(12) United States Patent
Voit et al.

(10) Patent No.: US 12,615,196 B2
(45) Date of Patent: Apr. 28, 2026

(54) SEASONAL AUTO-REACTIVE ENERGIZATION

(71) Applicant: Cisco Technology, Inc., San Jose, CA (US)

(72) Inventors: Eric A. Voit, Bethesda, MD (US); Antonio Garza, Austin, TX (US); Kabira Sethi, Fremont, CA (US); Jay Yoo, San Ramon, CA (US); Cristina Precup, Copenhagen (DK)

(73) Assignee: Cisco Technology, Inc., San Jose, CA (US)

( * ) Notice: Subject to any disclaimer, the term of this patent is extended or adjusted under 35 U.S.C. 154(b) by 57 days.

(21) Appl. No.: 18/430,132

(22) Filed: Feb. 1, 2024

(65) Prior Publication Data

US 2025/0254109 A1     Aug. 7, 2025

(51) Int. Cl.
H04L 41/5009          (2022.01)
H04L 41/0896          (2022.01)

(52) U.S. Cl.
CPC ...... H04L 41/5012 (2013.01); H04L 41/0896 (2013.01)

(58) Field of Classification Search
CPC ............. H04L 41/5012; H04L 41/0896; H04L 41/147; H04L 43/08; H04L 12/10
See application file for complete search history.

(56) References Cited

U.S. PATENT DOCUMENTS

| 10,841,766 | B2 * | 11/2020 | Yang | .................... | H04W 4/50 |
| 11,050,294 | B1 * | 6/2021 | Majd | .................... | H02J 1/102 |

| 11,307,885 | B1 * | 4/2022 | Luciano | ............... | G06F 9/5083 |
| 11,372,463 | B1 | 6/2022 | Callison et al. | | |
| 11,650,645 | B2 | 5/2023 | Charles et al. | | |

(Continued)

FOREIGN PATENT DOCUMENTS

| CN | 116646933 | B | 10/2023 |
| CN | 116845856 | A | 10/2023 |
| KR | 20050117888 | A | 12/2005 |

OTHER PUBLICATIONS

Search Report and Written Opinion for International Application No. PCT/US2025/013831, Dated Apr. 17, 2025, 17 pages.

*Primary Examiner* — Javier O Guzman
(74) *Attorney, Agent, or Firm* — Lee & Hayes, P.C.

(57)                    ABSTRACT

Techniques for tuning resource capacity for a network device are described. A component resource manager receives an expected utilization of the resource during a utilization volatility period from an auto energizing infrastructure. The utilization volatility period is a period of time during which a chance of a utilization increase of the resource is within a predetermined threshold. The component resource manager receives a calculation of a maximum potential capacity delta for the expected utilization of the resource during the utilization volatility period from the auto energizing infrastructure. Based on the expected utilization and the maximum potential capacity delta, the component resource manager determines the right-size capacity of the resource for the utilization volatility period. The right-size capacity is at least an amount of the resource needed to ensure proper network functioning. The component resource manager provides the right-size capacity of the resource during the utilization volatility period.

20 Claims, 8 Drawing Sheets

(56)                    References Cited

U.S. PATENT DOCUMENTS

| | | | | |
|---|---|---|---|---|
| 11,663,523 | B2 * | 5/2023 | Polleri | G06F 8/30 |
| | | | | 706/12 |
| 12,105,692 | B1 * | 10/2024 | Kumar | G06F 16/278 |
| 2016/0116933 | A1 | 4/2016 | Craig | |
| 2016/0217384 | A1 * | 7/2016 | Leonard | G06N 5/022 |
| 2019/0317826 | A1 * | 10/2019 | Jain | G06F 9/5077 |
| 2021/0306219 | A1 * | 9/2021 | Toy | H04L 43/0864 |
| 2021/0333857 | A1 * | 10/2021 | Aden | G06F 1/3206 |
| 2022/0164228 | A1 * | 5/2022 | Volobuev | G06F 16/217 |
| 2022/0374273 | A1 | 11/2022 | Eldar | |
| 2022/0385542 | A1 * | 12/2022 | Gokan Khan | H04L 41/0895 |
| 2023/0032310 | A1 | 2/2023 | Callison et al. | |
| 2023/0261935 | A1 * | 8/2023 | Bhagwan | H04L 41/0806 |
| | | | | 709/222 |

* cited by examiner

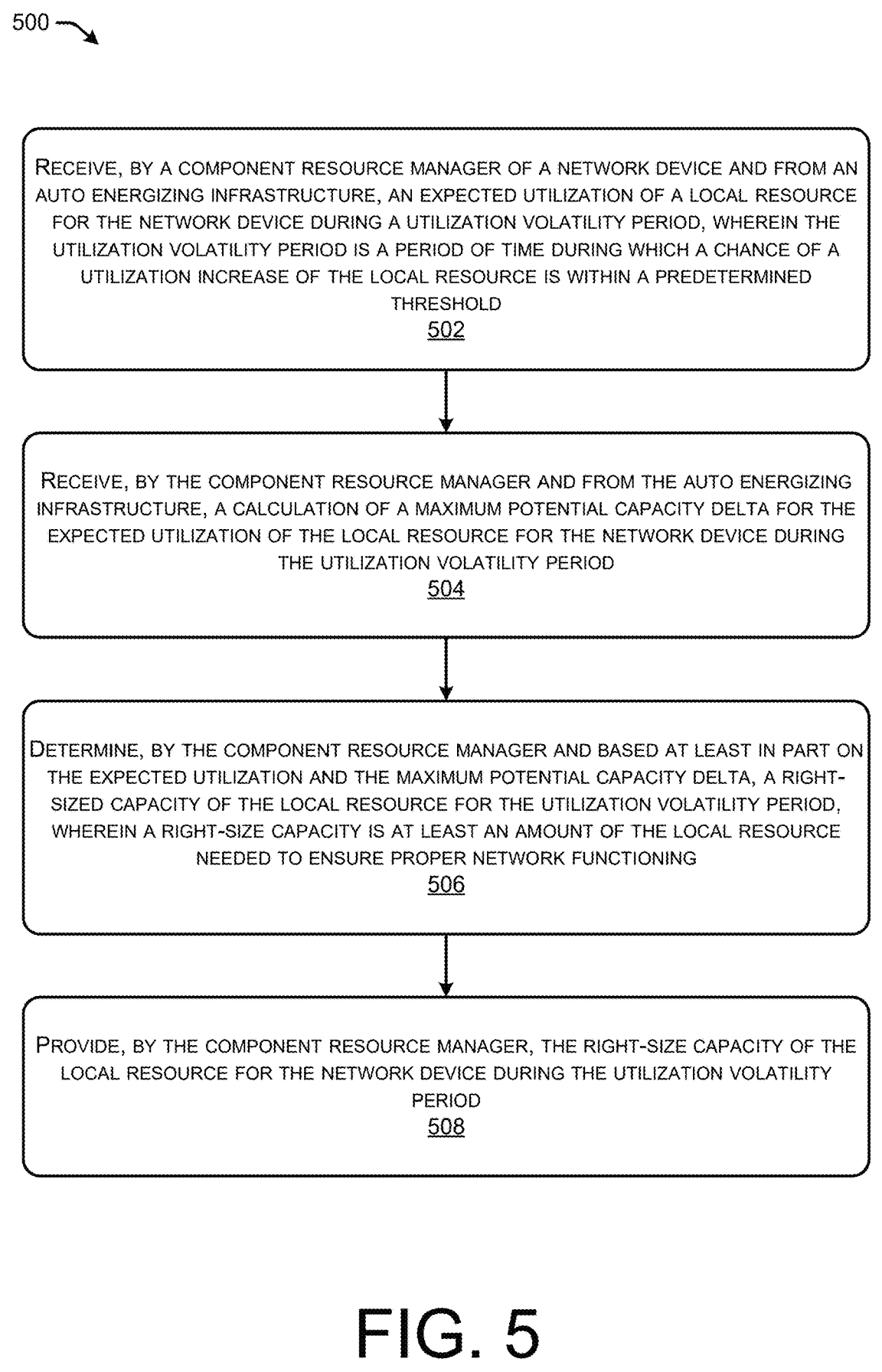

500 ⟍

RECEIVE, BY A COMPONENT RESOURCE MANAGER OF A NETWORK DEVICE AND FROM AN AUTO ENERGIZING INFRASTRUCTURE, AN EXPECTED UTILIZATION OF A LOCAL RESOURCE FOR THE NETWORK DEVICE DURING A UTILIZATION VOLATILITY PERIOD, WHEREIN THE UTILIZATION VOLATILITY PERIOD IS A PERIOD OF TIME DURING WHICH A CHANCE OF A UTILIZATION INCREASE OF THE LOCAL RESOURCE IS WITHIN A PREDETERMINED THRESHOLD
502

RECEIVE, BY THE COMPONENT RESOURCE MANAGER AND FROM THE AUTO ENERGIZING INFRASTRUCTURE, A CALCULATION OF A MAXIMUM POTENTIAL CAPACITY DELTA FOR THE EXPECTED UTILIZATION OF THE LOCAL RESOURCE FOR THE NETWORK DEVICE DURING THE UTILIZATION VOLATILITY PERIOD
504

DETERMINE, BY THE COMPONENT RESOURCE MANAGER AND BASED AT LEAST IN PART ON THE EXPECTED UTILIZATION AND THE MAXIMUM POTENTIAL CAPACITY DELTA, A RIGHT-SIZED CAPACITY OF THE LOCAL RESOURCE FOR THE UTILIZATION VOLATILITY PERIOD, WHEREIN A RIGHT-SIZE CAPACITY IS AT LEAST AN AMOUNT OF THE LOCAL RESOURCE NEEDED TO ENSURE PROPER NETWORK FUNCTIONING
506

PROVIDE, BY THE COMPONENT RESOURCE MANAGER, THE RIGHT-SIZE CAPACITY OF THE LOCAL RESOURCE FOR THE NETWORK DEVICE DURING THE UTILIZATION VOLATILITY PERIOD
508

FIG. 5

SEASONAL AUTO-REACTIVE ENERGIZATION

TECHNICAL FIELD

The present disclosure relates generally to forecasting maximum rates of increase in capacity utilization of a network resource for different time periods of an upcoming day in order to continuously tune the capacity of a local network device. The forecasted rate is then provisioned to the local network device such that the local network device can react to capacity spikes with sufficient spare capacity.

BACKGROUND

In today's competitive market, networks are critical resources for organizations. The ability to transmit data accurately and in a timely manner, is vital to the success of any enterprise organization. Thus, it is essential that sufficient power capacity is available for network devices to ensure this critical resource functions properly at all times regardless of fluctuations in network demand. Typically, this means that a power capacity must be available for the highest conceivable requirement at all times. However, because network devices do not consume power resources at the highest available capacity at all times, a significant amount of resources are wasted, resulting in significant wasted cost to an enterprise organization.

In addition to monetary cost, the wasted power resources present added environmental concerns, and today many enterprise organizations are working to reduce the cost to the environment. Thus, capacity right-sizing, or optimizing resources allocated to a network device to ensure sufficient allocation for proper network performance with the least amount of cost, both monetary and environmental, is essential for today's networks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 is a flow diagram illustrating an example method associated with the techniques described herein for provisioning right-size capacity of a local resource to a network device.

DESCRIPTION OF EXAMPLE EMBODIMENTS

Overview

Figure 1:
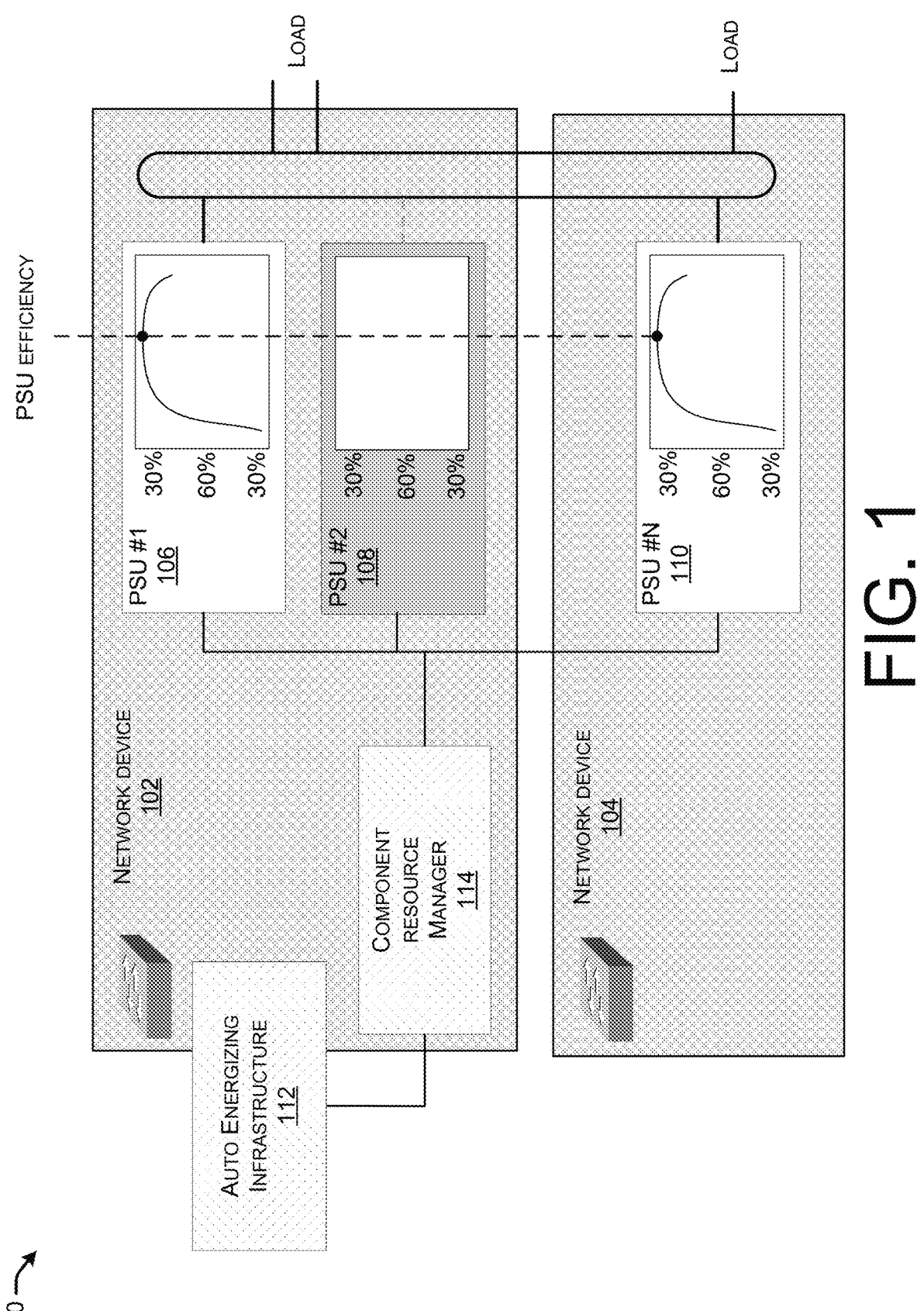
FIG. 1 illustrates an example environment that may implement various aspects of the technologies directed to self-tuning a right-sized capacity of a network resource for a local network device.

This disclosure describes a method, performed at least in part by a component resource manager of a network device and for provisioning a right-sized capacity of a local resource for the network device. The method includes receiving, from an auto energizing infrastructure, an expected utilization of the local resource for the network device during a utilization volatility period, wherein the utilization volatility period is a period of tie during which a chance of a utilization increase of the local resource is within a predicted threshold. The method also includes receiving, from the auto energizing infrastructure, a calculation of a maximum potential capacity delta for the expected utilization of the local resource for the network device during the utilization volatility period. The method also includes determining, based at least in part on the expected utilization and the maximum potential capacity delta, the right-sized capacity of the local resource for the utilization volatility period, wherein the right-sized capacity is at least an amount of the local resource needed to ensure proper network functioning. Finally, the method also includes providing the right-sized capacity of the local resource for the network device during the utilization period.

Additionally, the techniques described herein may be performed by a system and/or device having non-transitory computer-readable media storing computer-executable instructions that, when executed by one or more processors, performs the method described above.

EXAMPLE EMBODIMENTS

As described above, capacity right-sizing of resources is essential for network devices (e.g., routers, switches, etc.) in today's networking environment. Knowing how much of a resource (e.g., power) is needed at any given time is critical for proper network functioning. Due to the criticality of network functioning, capacity of a resource is kept at maximum even when unnecessary since capacity demand can jump quickly. Thus, seasonal resource underutilization is an issue relevant to PSUs, ASICs, CPU cores and many other components with variable demand. However, as mentioned above, because network devices do not consume resources at the highest available capacity at all times, a significant amount of resources are wasted, resulting in significant unnecessary monetary and environmental costs for enterprise organizations.

Manual configuration of resource savings is both unaffordable and risky, and with the plethora of historical data available, it is not necessary. One common approach to resource capacity right-sizing is to utilize time series forecasting machine learning (ML) tools. Time series forecasting is a technique used to predict the future value of the resource over a period of time. The future value required is forecast or predicted based on what has already happened. Future events are predicted by analyzing the trends of the past. Some of the important factors in time series forecasting include, an amount of data, which is the amount of past data values collected at predetermined time intervals used for prediction analysis, and seasonality, which is a characteristic of the time series in which the data experiences regular and predictable changes that recur over a set period of time (e.g., year, season, month, week, day, etc.) However, it is not affordable to continually run time-series predictions within a local network device. In addition, many time series algorithms are too slow to react to ensure sufficient resource capacity for proper network functioning. Therefore, there is a need to periodically predict upcoming utilization volatility based on historical data within a certain accuracy threshold, and publish the relevant predictions as energization policies back to the local network device.

This disclosure is directed to periodically predicting a maximum rate of increase, potential delta, or "spike", in network resource capacity utilization for local network devices during different time periods of an upcoming day. This information is then passed to a component resource manager of a local network device that can ensure enough capacity is energized to cover any spike in network resource capacity above a current or existing load. With guidance on the maximum rate of increase during the upcoming day, the component resource manager will be able to quickly react and self-tune the resource capacity of the local network device. Based on available network device telemetry available, reaction time to energize the necessary capacity to serve the sum of the current utilization and the maximum increase may be as quick as a couple of seconds or less. Herein, Power Supply Units (PSUs) are used as an example network resource for a local network device. However, it should be understood by those skilled in the art that PSUs are an example and not a limitation, as the algorithm can apply to any other appropriate network resource (e.g., ASICs, CPU cores, etc.).

The logic of the techniques described herein may be implemented across two components or modules, an auto energizing infrastructure and a component resource manager. In some examples the auto energizing infrastructure may reside on a network controller, and in other instances the auto energizing infrastructure may reside on the local network device (e.g., router, switch, etc.). The auto energizing infrastructure auto-determines an expected capacity of a network resource for various utilization volatility periods during a period of time (e.g., a day) and a capacity utilization volatility that is possible during each of these periods. The capacity utilization volatility period is a period of time where the chance of a capacity utilization increase is roughly the same. A set of utilization volatility periods for an upcoming day can be established manually or can be calculated automatically using predicted seasonality. Additionally, the auto energizing infrastructure calculates the maximum capacity utilization increase, "spike", or potential delta of a network resource expected during any sliding period of time during the utilization volatility period having a duration equal to a capacity increase latency (i.e., the amount of time between a last measurement which does not exceed a capacity trigger or threshold and the first measurement after a capacity change has been instituted following a first measurement which exceeds the capacity trigger or threshold). In some examples, the maximum rate of increase may be based on six standard deviations of increase (or four standard deviations, or two standard deviations). The auto energizing infrastructure provisions as policy the auto determined expected network resource utilization and the maximum potential capacity delta, or capacity utilization volatility, of each utilization volatility period, to the component resource manager for purposes of resource savings and environmental benefit.

When the component resource manager receives the expected network resource utilization and the capacity utilization volatility, or maximum potential capacity delta, of each utilization volatility period from the auto energization infrastructure, algorithms may be run, whenever utilization telemetry is received, to determine a right-size capacity of the local resource for the utilization volatility period. Thus, providing a right-sized capacity of the local resource based on local traffic conditions. A right-size capacity of the local resource is at least an amount of the local resource needed to ensure proper network functioning. In some examples this may happen multiple times a second, in other examples this may happen every few minutes. These algorithms can increase or decrease the number of energized hardware elements providing incremental capacity of the network resource. The algorithms may be based at least in part on the calculated maximum potential capacity delta for the expected utilization of the local resource for a network device during the utilization volatility period. Example algorithms are discussed in further detail with reference to FIG. 4. In some examples a component resource manager may be located on one or more network devices, in other examples a stand-alone hardware unit may be communicatively coupled to one or more network devices and provide an optimized or right-sized capacity of the local resource to the one or more network devices.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 that may implement various aspects of the technologies directed to providing a right-size capacity of a local resource for a network device during a utilization volatility period. Environment 100 includes network device 102 and network device 104. It should be understood that two network devices is an example and any number of devices in a network may implement various aspects of the technologies described herein. Network device 102 and network device 104 may be part of a software defined wide area network (SD-WAN) that includes multiple network devices and a network controller that orchestrate network functions. Network device 102 and network device 104 may represent a router, switch, or any other appropriate network device that may make up a network fabric. As an example of a network resource, environment 100 illustrates network device 102 as having power supply unit (PSU) #1 106 and PSU #2 108 to provide power resources for network device 102. Similarly, network device 104 is illustrated as having PSU #N 110 for providing power. Note, PSUs are used as an example network resource and the techniques described herein are not limited to PSU and may be applied to any other appropriate network resources (e.g., ASICs, etc.). In addition, the network devices are not limited to one or two PSUs, any appropriate number may be applicable.

Environment 100 also include auto energizing infrastructure 112 and component resource manager 114. Auto energizing infrastructure 112 determines an expected utilization of PSU capacity for network device 102 and network device

104 during utilization volatility periods throughout a day. The utilization volatility period is a period of time during which a chance of a utilization increase of power is within a predetermined threshold. In addition, the auto energizing infrastructure 112 calculates a maximum potential capacity delta for the expected utilization of PSUs during each utilization volatility period. The auto energizing infrastructure 112 then sends the expected utilization of PSU capacity and the calculated maximum potential delta for the expected utilization of PSU capacity to component resource manager 114. Component resource manager 114 can then react to local traffic conditions and determine a right-size capacity of PSUs for network device 102 and network device 104. For example, network device 102 has two PSUs available PSU #1 106 and PSU #2 108, however only PSU #1 106 is shown as energized and providing power to network device 102 according to the determination of the right-size capacity of power necessary for proper network functioning during a particular utilization volatility period and based on local traffic conditions. PSU #2 108 is not energized but available should it be needed.

In some examples the auto energizing infrastructure 112 determines the expected utilization of PSU capacity and the calculated maximum potential delta for the expected utilization of PSU capacity periodically for each utilization volatility period. The auto energizing infrastructure 112 may use time series forecasting artificial intelligence (AI) tools (e.g., ARIMA, SARIMA, Random Forest, FP Prophet, Holt Winters, SARIMAX, Differential Evolution, Transformer-based machine learning models, etc.) to determine the expected utilization of PSUs. The performance of the forecasting may continually be improved over time. The auto energizing infrastructure 112 can keep track of the forecasting error to assess the performance in terms of accuracy of the estimation model. This error can be calculated using various methods, for example, root mean square error (RMSE), mean square error (MSE), mean absolute error (MAE), or any appropriate error method that may calculate the average difference between the forecasted values and the true values over a given period of time.

The maximum potential capacity delta may be calculated by the auto energizing infrastructure 112 for a utilization volatility period using various methodologies. For example, time series agglomerative hierarchical clustering may be used to analyze raw data and select sets of time clusters with a similar maximum slope. In some examples, stochastic volatility models may be used, such as Heston model, SABR model, and Generalized Autoregressive Conditional Heteroskedasticity with Leveraging (GARCH-L). Alternately or in addition, GARCH models where the mean and variance of time series are considered to forecast volatility may be used. The aforementioned various models are examples of AI tools that may be used to determine utilization volatility, and are not meant to be limiting, any appropriate model may be used to determine the maximum capacity delta during a utilization volatility period.

Once the expected utilization is determined the component resource manager 114 can then use this information combined with measured data points received via telemetry and indicating local network traffic conditions, algorithmically self-tune PSU capacity utilization by increasing or decreasing the number of energized hardware elements providing incremental capacity on a much shorter time scale. For example, an algorithm may be run every few minutes of even every few seconds, thus maximizing power savings, decreasing monetary resources, and increasing environmental benefits. In some instances, the auto energizing infrastructure 112 is located in a network controller that orchestrates network functions. Alternately or in addition, the auto energizing infrastructure may be located on a network device, such as network device 102 and/or network device 104. In various instances, a component resource manager 114 may be located on network device 102 and communicatively couple to network device 104 as illustrated in environment 100. In other examples, both network device 102 and network device 104 may each contain a dedicated component resource manager 114. In still another example, component resource manager 114 may be a stand-alone hardware unit communicatively coupled to one or more network devices.

Figure 2:
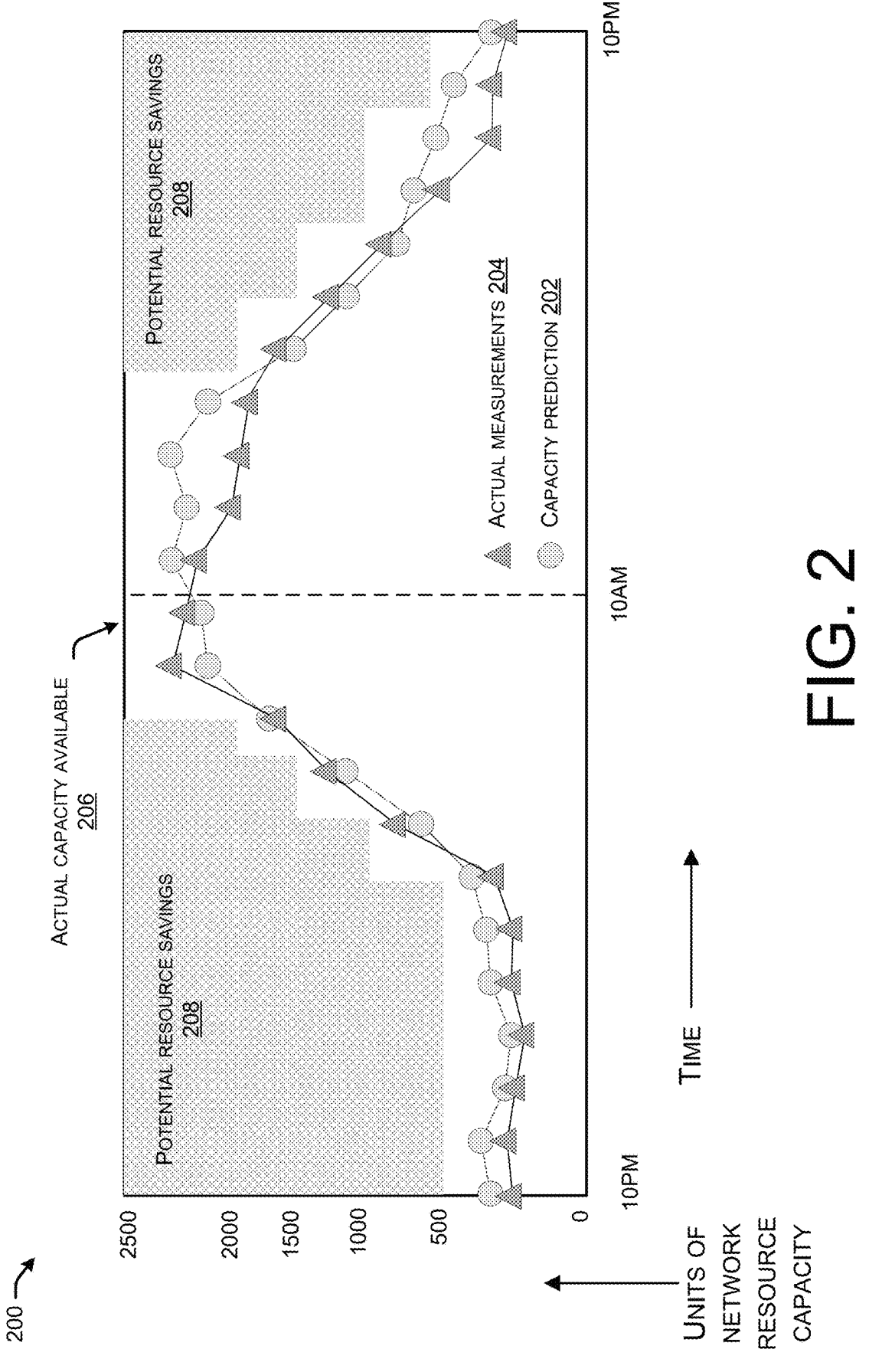
FIG. 2 illustrates a 24-hour graph of an example capacity prediction, actual measurements, and potential resource savings.

FIG. 2 illustrates a graph 200 of example units of network resource capacity utilization, both actual and predicted over a 24-hour period from 10 PM one day to 10 PM on a subsequent day. Graph 200 illustrates an example of capacity prediction 202 of a network resource as determined by an auto energizing infrastructure (e.g., auto energizing infrastructure 112 of FIG. 1). Various automated time series forecasting models may be used to predict the seasonal capacity demand for the network resource. In addition, it is possible to improve upon historical estimates for seasonality where known events might happen. For example, configuration changes might have recently been made which could result in a known upcoming uptick in power utilization, but this data has not yet been learned by the seasonality algorithm. To cover this, it is possible to explicitly adjust the calculations made by provisioning additional factors into an upper bound capacity boundary calculation for explicitly limited amounts of time (e.g., adjust the upper bound calculation from 3:59 PM-4:01 PM by 50 W to account for a new load coming on-line today). Examples of this type of situation where adjustments to historical estimates for seasonality may be made include but are not limited to the following: onboarding of devices during the negotiation phase, or simply off/on scheduling; PoE pass through power due to group of devices getting activated (e.g., cameras, access points, lights, etc.); ASIC BW utilization at a particular time of the day due to some configuration; CPU app-hosted application power utilization known to trigger power budget request; and minimum rates of power energization protection.

Additionally, graph 200 illustrates data points of the actual measurements 204 of the units of network resource capacity. The actual measurements 204 may be acquired via network device telemetry. As illustrated, the actual measurements 204 generally follow the capacity prediction 202 but are not exact, as is expected. Additionally, graph 200 shows the actual capacity available 206 of the network resource. As illustrated, at all times in the 24-hour period the actual capacity available 206 is sufficient for proper network functioning, however, a significant amount of the resource is wasted as shown by the shaded area of potential resource savings 208. Thus, by implementing techniques described herein, there is a high potential of significant resource savings.

Figure 3:
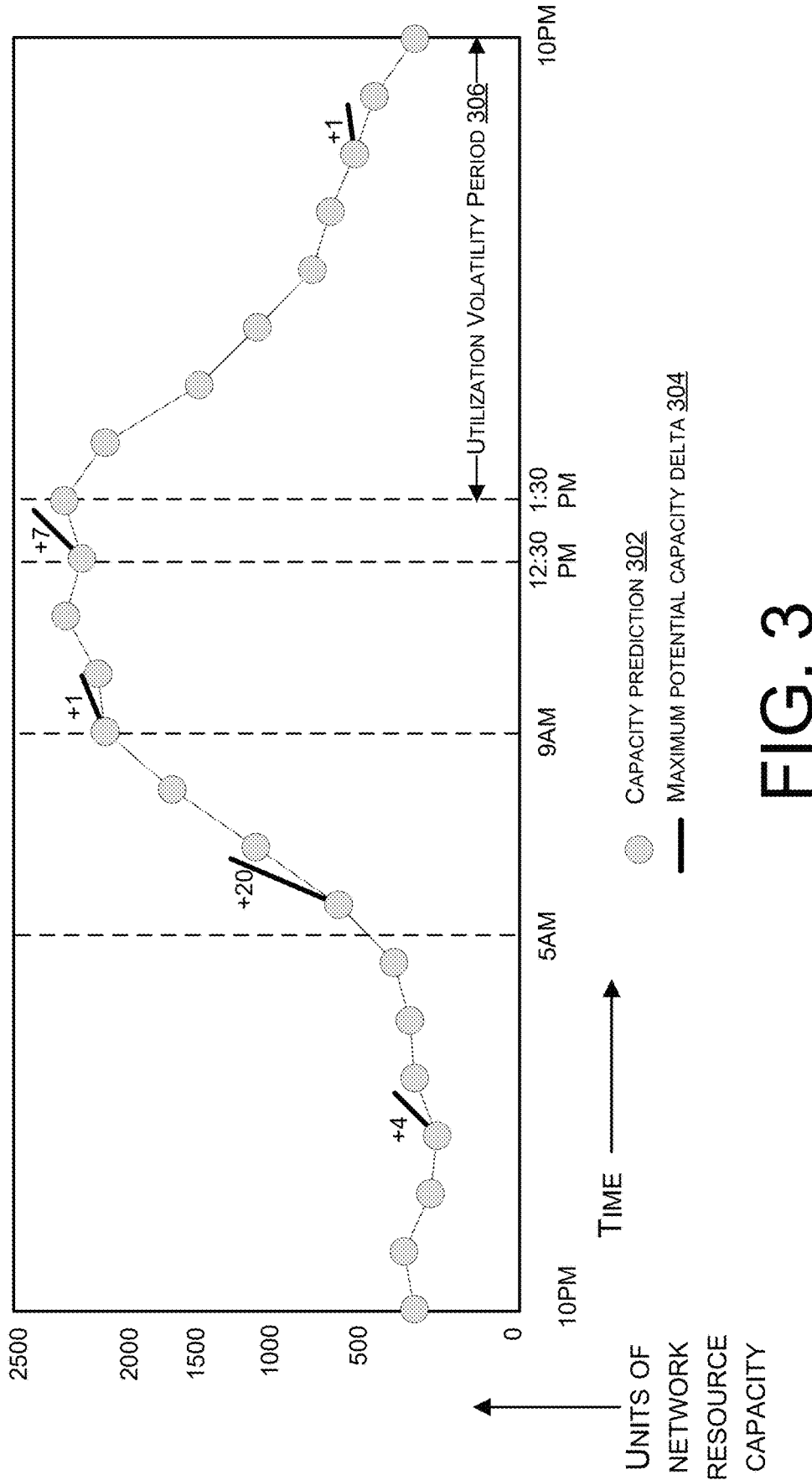
FIG. 3 illustrates a 24-hour graph of an example capacity prediction and a maximum potential capacity delta for utilization volatility periods.

FIG. 3 illustrates a graph 300 showing the network resource capacity prediction 302 and a maximum potential capacity delta 304 for each of five utilization volatility periods 306 during the same 24-hour period as graph 200 of FIG. 2. The capacity prediction 302 is determined by the auto energizing infrastructure (e.g., auto energizing infrastructure 112 of FIG. 1) using time series forecasting models. The maximum potential capacity delta 304 is calculated by the auto energizing infrastructure for each utilization volatility period 306. For example, time series agglomerative hierarchical clustering may be used to analyze historical raw data and select sets of time clusters with a similar maximum slope. However, this is by example and not limitation. There are many different algorithms that may be used to calculate the maximum potential capacity delta 304. Alternately or in addition, a union of results from various algorithms may be used to determine the maximum potential capacity delta 304. Additionally, an acceptable failure rate (e.g., six sigma confidence) may determine which algorithm(s) to are to be used to determine the maximum potential capacity delta 304 for each utilization volatility period 306. For example, outlier confidence interval, six standard deviations, Gumble R variance, maximum resource spike during the minute over 31 days, neural networks, long short term memory (LSTM), root mean square, and other ML or AI tools all may be used individually or in combination to determine the maximum potential capacity delta 304 for each utilization volatility period 306.

The set of five utilization volatility periods 306 may be established manually or can be calculated automatically using predicted seasonality. As shown is graph 300 the first utilization volatility period is from 10 PM to 5AM, a time of typically low network usage where the majority of users are likely sleeping. This is evidenced by the fairly low capacity prediction 302. Based on analysis of historical data, the maximum potential capacity delta 304 as calculated by the auto energizing infrastructure is determined to be a maximum of +4. In contrast, the utilization volatility period between 5 AM and 9 AM is a time where resource utilization may ramp up quickly and be much more volatile as users are typically arriving to work. Thus, analysis of historical data results in a much higher high maximum potential capacity delta 304 of +20.

Figure 4:
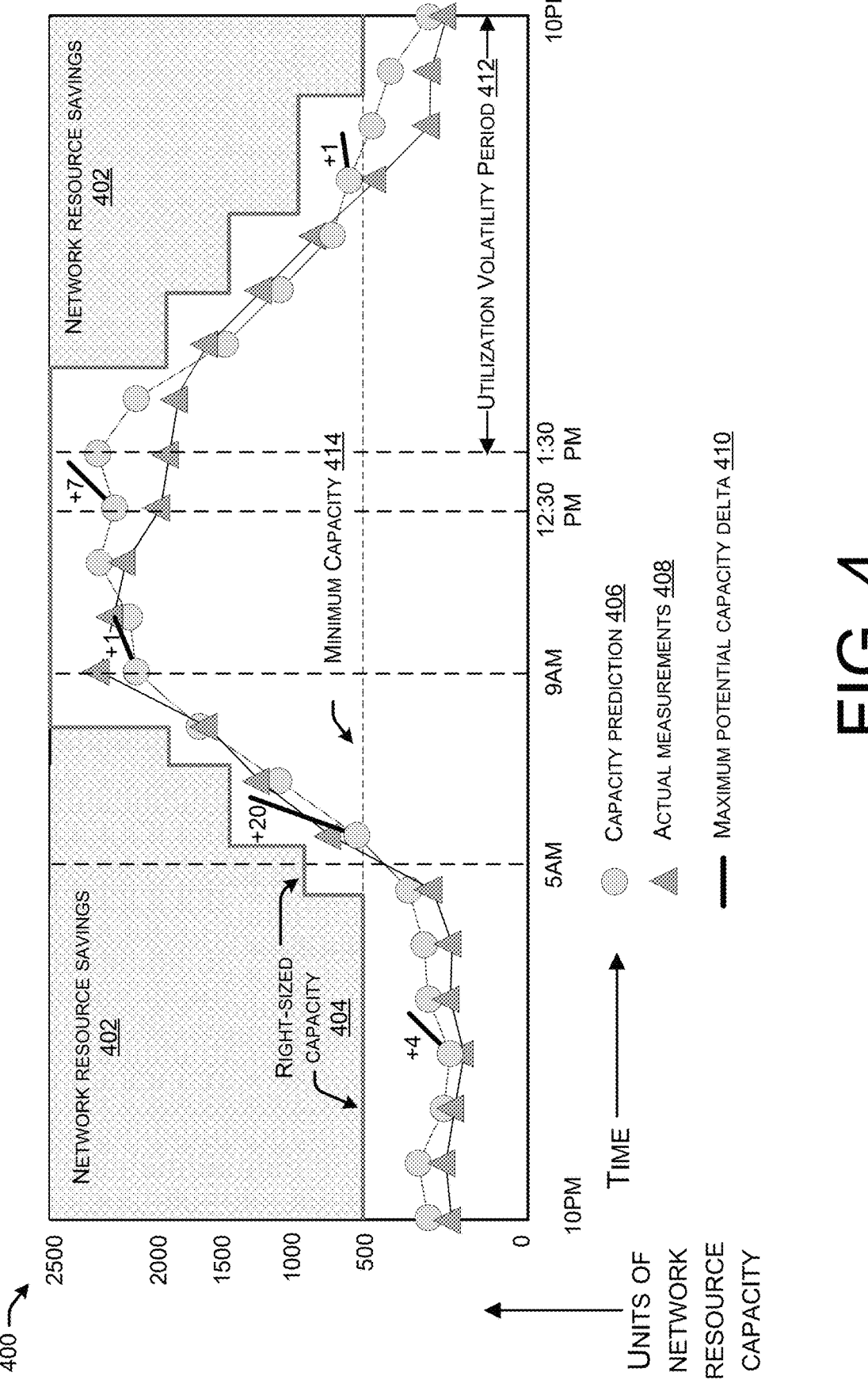
FIG. 4 illustrates a 24-hour graph of network resource savings realized by implementing various aspects of the technologies described herein.

FIG. 4 illustrates a graph 400 showing network resource savings 402 that may be achieved when techniques described herein for self-tuning network resource capacity by a component resource manager of a network device are implemented. Graph 400 incorporates the information from graph 200 and graph 300 over the same 24-hour period and shows the right-sized capacity 404 of the local network resource. Graph 400 includes a capacity prediction 406 that is determined by the auto energizing infrastructure (e.g., auto energizing infrastructure 112 of FIG. 1) and sent to a component resource manager (e.g., component resource manager 114 of FIG. 1). The capacity prediction 406 may be determined using various time series forecasting AI tools. Graph 400 also include actual measurements 408 of utilized network resource capacity acquired via telemetry. Graph 400 also include a maximum potential capacity delta 410, calculated by the auto energizing infrastructure for each utilization volatility period 412. Using the capacity prediction 406, actual measurements 408, and maximum potential capacity delta 410, the component resource manager can determine a right-sized capacity 404 for the network device during each utilization volatility period 412. As shown in graph 400, the component resource manager can self-tune the network resource and increase or decrease the number of energized hardware elements incrementally as shown in graph 400 to ensure that a sufficient amount of the network resource is available for proper network functioning, while at the same time maximizing the amount of network resource savings 402. In addition, in some instances there may be a minimum capacity 414 of the network resource that is always available regardless of the expected or actual resource utilization.

The component resource manager may algorithmically self-tune network resource capacity utilization to arrive at a right-sized capacity 404 of the network resource. For example, upper capacity and lower capacity boundaries may be determined and capacity triggers may be set in which a determination is made as to whether an upper capacity boundary or a lower capacity boundary has been breached. These triggers may be set each time a new utilization volatility period 412 is entered, and/or if energizing or deenergizing of capacity has recently occurred. Examples of the triggers to energize or deenergize capacity may be based on the following algorithm. Note the algorithm is an example and is not meant to be limiting, other appropriate equations may be used to determine right-sized capacity of a network resource for a network device by the component resource manager.

Setting the Capacity Triggers

> Upper capacity bound=(sum currently energized capacity—maximum potential capacity delta–(if $N$+1 redundancy)largest currently energized resource capacity)

> Lower capacity bound=(sum currently energized capacity—maximum potential capacity delta– least efficient currently energized resource capacity—(if $N$+1 redundancy)$2^{nd}$ least efficient currently energized resource capacity)—(optional)factors to dampen potential oscillating resource on/off directives based*on* historical trends Determining if a Capacity Boundary has been Breached— Determined when Utilization Telemetry Arrives > If (((current utilization>=upper capacity bound) AND all capacity is not already energized.)
> OR
> (For each of the last "X" minutes of measurements, (current utilization<=lower capacity bound).))
> THEN
> Determine which elements of capacity to energize against the current load.

FIG. 5 is a flow diagram illustrating an example method 500 associated with the techniques described herein for provisioning a right-sized network resource capacity to a network device based on local traffic conditions, an expected utilization of the network resource, and a maximum potential capacity delta. Example method 500 illustrates aspects of the functions performed by network device 106 as described with reference to FIG. 1. The logical operations described herein with respect to FIG. 5 may be implemented (1) as a sequence of computer-implemented acts or program modules running on a computing system and/or (2) as interconnected machine logic circuits or circuit modules within the computing system. In some examples, the method(s) 500 may be performed by a system comprising one or more processors and one or more non-transitory computer-readable media storing computer-executable instructions that, when executed by the one or more processors, cause the one or more processors to perform the method(s) 500.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 502 a component resource manager of a network device receives an expected utilization of a local resource for the network device during a utilization volatility period from an auto energizing infrastructure. The utilization volatility period is a period of time during which a chance of a utilization increase of the local resource is within a predetermined threshold. For example, with reference to FIG. 1 the component resource manager 114 of network device 102 receives an expected utilization of a PSUs (e.g., PSU #1 106 and PSU #2 108) from the auto energizing infrastructure 112. Additionally, with reference to FIG. 4 the component resource manager of a network device receives a capacity prediction 406 (i.e., an expected utilization of a local resource) for a network device during the utilization volatility periods 412. The five utilization volatility periods shown in FIG. 4 are period of time during 24-hours graphed in which a chance of a utilization increase of the local resource is withing a predetermined threshold. In other words, a period of time in which a utilization increase is roughly the same. The set of utilization volatility period may be established manually or can be calculated automatically using predicted seasonality. For example, as shown in FIG. 4 periods of time where peoples are most likely arriving in an enterprise building or home office for work resulting in a potential for high volatility (e.g., arriving for work between 5 AM and 9 AM, or returning to work after a lunch break from 12:30 PM to 1:30 PM) may be determined to be times where the chance of utilization increase is roughly the same.

At operation 504 the component resource manager receives a calculation of a maximum potential capacity delta for the expected utilization of the local resource for the network device during the utilization volatility period from the auto energizing infrastructure. For example, with reference to FIG. 1 the component resource manager 114 receives a calculation of a maximum potential capacity delta for the expected utilization of PSUs for network device 102 during the utilization volatility period from the auto energizing infrastructure 112. With reference to FIG. 4, the component resource manager receives a calculation of a maximum potential capacity delta 410 for the expected capacity prediction 406 (i.e., the expected utilization) of the local resource for the network device during each of the utilization volatility periods 412 from the auto energizing infrastructure.

At operation 506, based at least in part on the expected utilization and the maximum potential capacity delta, the component resource manager determines a right-sized capacity of the local resource for the utilization volatility period. The right-sized capacity is at least an amount of the local resource needed to ensure proper network functioning. For example, with reference to FIG. 1 the component resource manager 114 determines a right-sized number of PSUs for network device 102 and network device 104 for the utilization volatility period needed to ensure proper network functioning. Additionally, with reference to FIG. 4 based the capacity prediction 406 (i.e., expected utilization) and the maximum potential capacity delta 410, the component resource manager determines a number of units of network resource capacity necessary for proper network functioning for each utilization volatility period 412.

At operation 508 the component resource manager provides the right-sized capacity of the local resource for the network device during the utilization volatility period. For example, with reference to FIG. 1 the component resource manager 114 provides the right-sized capacity of PSUs to network device 102 and network device 104. For example, as illustrated in FIG. 1, the right-sized capacity of PSUs provided for network device 102 is PSU #1 106 and not PSU #2 108. Thus, power savings are realized, as only a number of PSUs necessary for proper network functioning are energized for network device 102.

Figure 6:
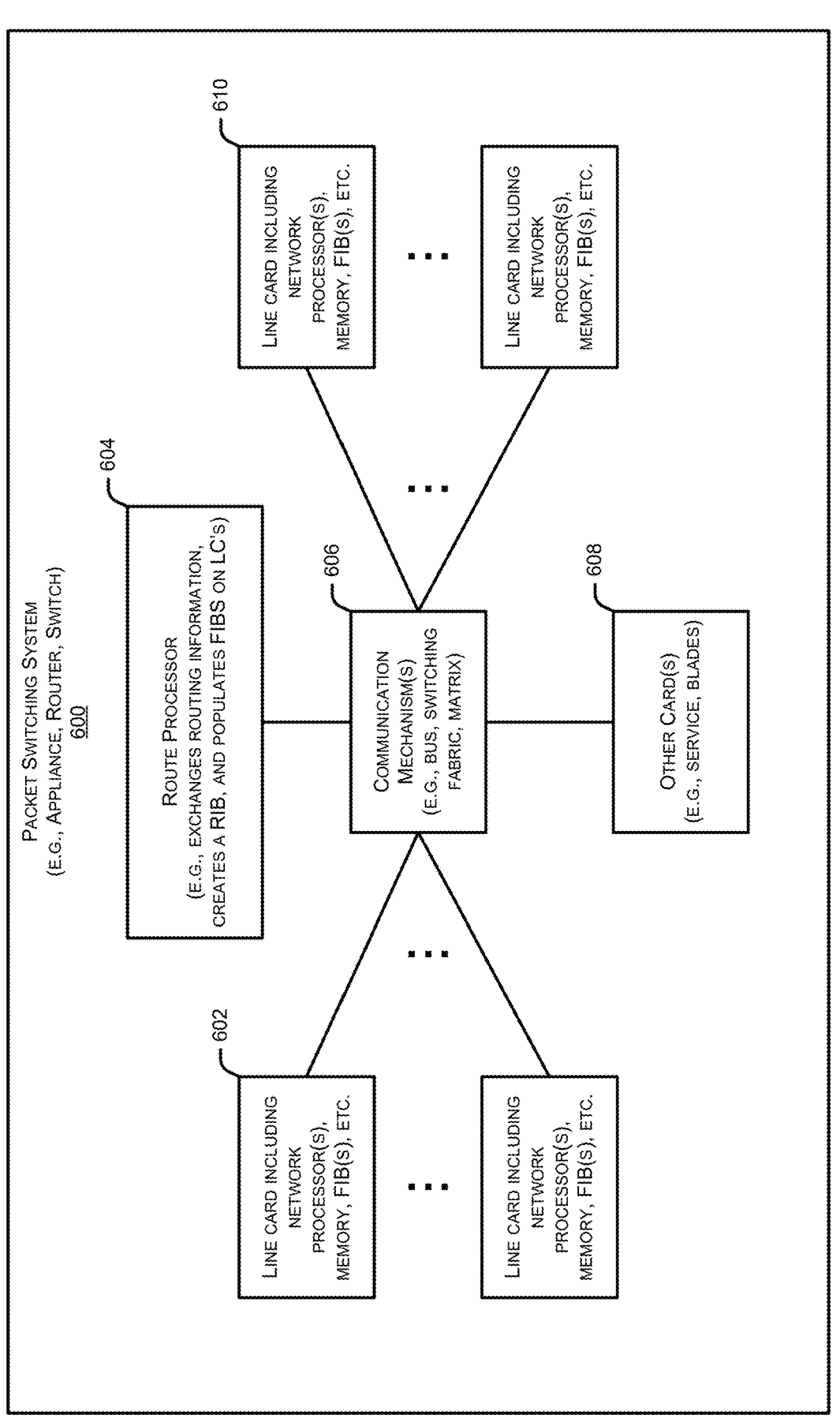
FIG. 6 illustrates a block diagram illustrating an example packet switching system that can be utilized to implement various aspects of the technologies disclosed herein.

FIG. 6 illustrates a block diagram illustrating an example packet switching device (or system) 600 that can be utilized to implement various aspects of the technologies disclosed herein. In some examples, packet switching device(s) 600 may be employed in various networks, such as, for example, network device 102 and network device 104 described with respect to FIG. 1.

In some examples, a packet switching device 600 may comprise multiple line card(s) 602, 610, each with one or more network interfaces for sending and receiving packets over communications links (e.g., possibly part of a link aggregation group). The packet switching device 600 may also have a control plane with one or more processing elements for managing the control plane and/or control plane processing of packets associated with forwarding of packets in a network. The packet switching device 600 may also include other cards 608 (e.g., service cards, blades) which include processing elements that are used to process (e.g., forward/send, drop, manipulate, change, modify, receive, create, duplicate, apply a service) packets associated with forwarding of packets in a network. The packet switching device 600 may comprise hardware-based communication mechanism 606 (e.g., bus, switching fabric, and/or matrix, etc.) for allowing its different entities, line cards 602, 604, 608 and 610 to communicate. Line card(s) 602, 610 may typically perform the actions of being both an ingress and/or an egress line card 602, 610, in regard to multiple other particular packets and/or packet streams being received by, or sent from, packet switching device 600.

Figure 7:
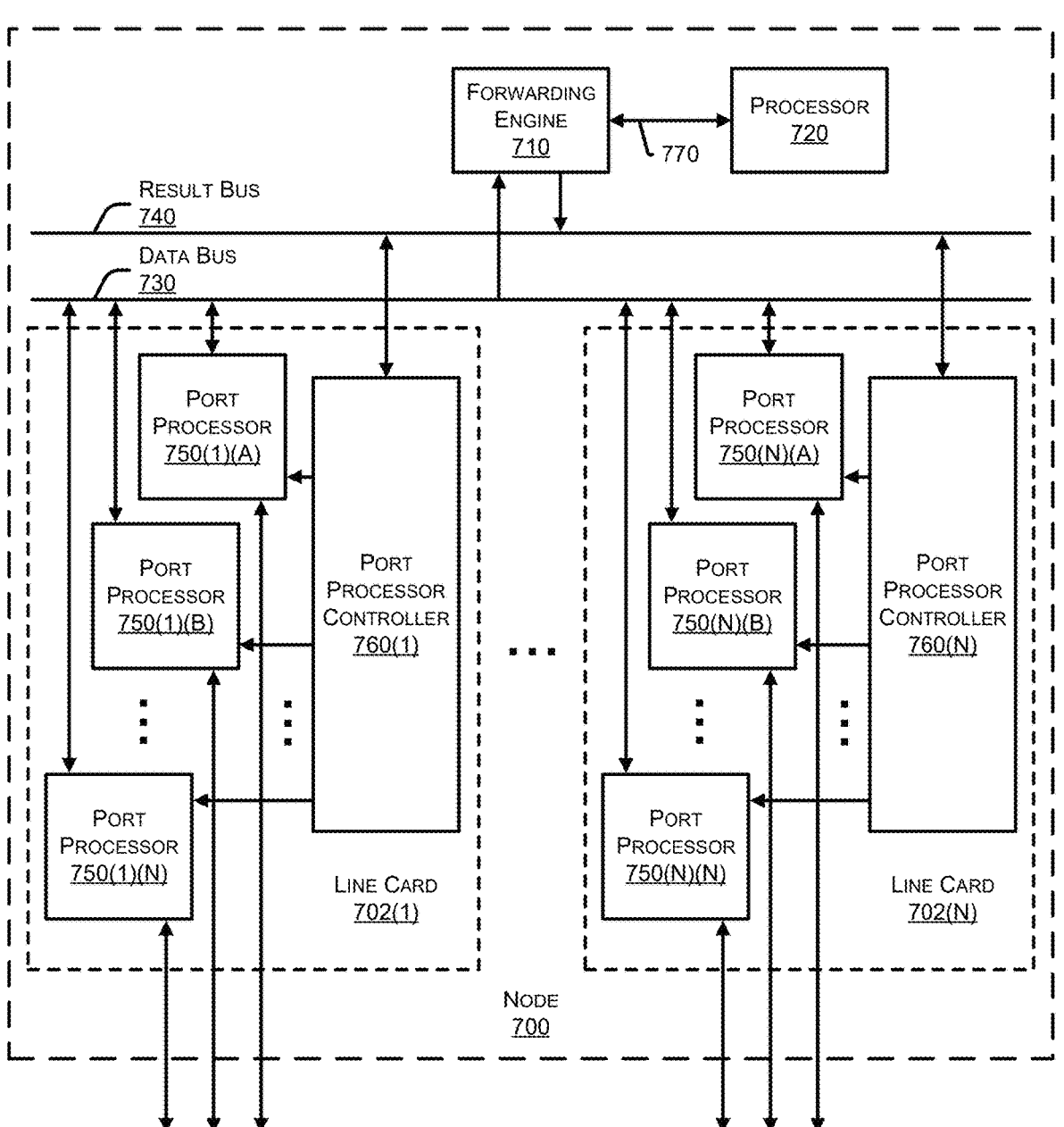
FIG. 7 illustrates a block diagram illustrating certain components of an example node that can be utilized to implement various aspects of the technologies disclosed herein.

FIG. 7 illustrates a block diagram illustrating certain components of an example node 700 that can be utilized to implement various aspects of the technologies disclosed herein. In some examples, node(s) 700 may be employed in various networks, such as, for example network device 102 and network device 104 as described with respect to FIG. 1.

In some examples, node 700 may include any number of line cards 702 (e.g., line cards 702(1)-(N), where N may be any integer greater than 1) that are communicatively coupled to a forwarding engine 710 (also referred to as a packet forwarder) and/or a processor 720 via a data bus 730 and/or a result bus 740. Line cards 702(1)-(N) may include any number of port processors 750(1)(A)-(N)(N) which are controlled by port processor controllers 760(1)-(N), where N may be any integer greater than 1. Additionally, or alternatively, forwarding engine 710 and/or processor 720 are not only coupled to one another via the data bus 730 and the result bus 740, but may also communicatively coupled to one another by a communications link 770.

The processors (e.g., the port processor(s) 750 and/or the port processor controller(s) 760) of each line card 702 may be mounted on a single printed circuit board. When a packet or packet and header are received, the packet or packet and header may be identified and analyzed by node 700 (also referred to herein as a router) in the following manner. Upon receipt, a packet (or some or all of its control information)

or packet and header may be sent from one of port processor(s) 750(1)(A)-(N)(N) at which the packet or packet and header was received and to one or more of those devices coupled to the data bus 730 (e.g., others of the port processor(s) 750(1)(A)-(N)(N), the forwarding engine 710 and/or the processor 720). Handling of the packet or packet and header may be determined, for example, by the forwarding engine 710. For example, the forwarding engine 710 may determine that the packet or packet and header should be forwarded to one or more of port processors 750(1)(A)-(N)(N). This may be accomplished by indicating to corresponding one(s) of port processor controllers 760(1)-(N) that the copy of the packet or packet and header held in the given one(s) of port processor(s) 750(1)(A)-(N) (N) should be forwarded to the appropriate one of port processor(s) 750(1)(A)-(N)(N). Additionally, or alternatively, once a packet or packet and header has been identified for processing, the forwarding engine 710, the processor 720, and/or the like may be used to process the packet or packet and header in some manner and/or maty add packet security information in order to secure the packet. On a node 700 sourcing such a packet or packet and header, this processing may include, for example, encryption of some or all of the packets or packet and header's information, the addition of a digital signature, and/or some other information and/or processing capable of securing the packet or packet and header. On a node 700 receiving such a processed packet or packet and header, the corresponding process may be performed to recover or validate the packets or packet and header's information that has been secured.

Figure 8:
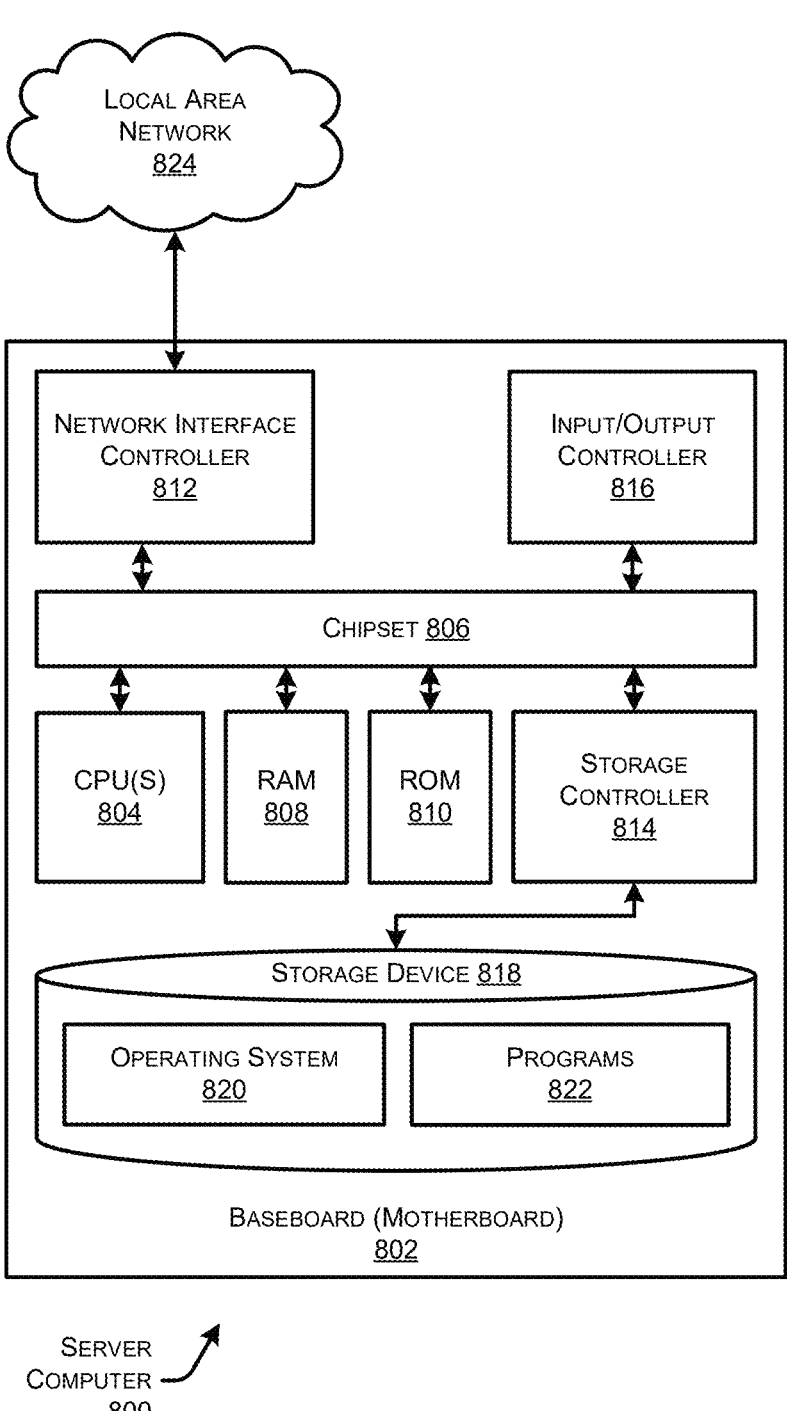
FIG. 8 is a computer architecture diagram showing an illustrative computer hardware architecture for implementing a server device that can be utilized to implement aspects of the various technologies presented herein.

FIG. 8 shows an example computer architecture for a computing device (or network routing device) 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. The computing device 800 may, in some examples, correspond to a network device such as network device 102 or network device 104, the auto energizing infrastructure 112, the component resource manager 114, the packet switching system 600, and/or the node 700 described herein with respect to FIGS. 1, 6 and 7, respectively.

The computing device 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computing device 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computing device 800. The chipset 806 can further provide an interface to a computer-readable storage medium such as a read-only memory ("ROM") 810 or non-volatile RAM ("NVRAM") for storing basic routines that help to startup the computing device 800 and to transfer information between the various components and devices. The ROM 810 or NVRAM can also store other software components necessary for the operation of the computing device 800 in accordance with the configurations described herein.

The computing device 800 can operate in a networked environment using logical connections to remote computing devices and computer systems through a network, such as the network 824. The chipset 806 can include functionality for providing network connectivity through a NIC 812, such as a gigabit Ethernet adapter. The NIC 812 is capable of connecting the computing device 800 to other computing devices over the network 824. It should be appreciated that multiple NICs 812 can be present in the computing device 800, connecting the computer to other types of networks and remote computer systems.

The computing device 800 can be connected to a storage device 818 that provides non-volatile storage for the computing device 800. The storage device 818 can store an operating system 820, programs 822, and data, which have been described in greater detail herein. The storage device 818 can be connected to the computing device 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computing device 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 can further read information from the storage device 818 by detecting the physical states or characteristics of one or more particular locations within the physical storage units.

In addition to the mass storage device 818 described above, the computing device 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 800. In some examples, the operations performed by the network device 102, network device 104, auto energizing infrastructure 112, and the component resource manager 114, and or any components included therein, may be supported by one or more devices similar to computing device 800. Stated otherwise, some or all of the operations performed by the network device 102, the network device 104, the auto energizing infrastructure 112, the component resource manager 114, and or any components included therein, may be performed by one or more computing device 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computing device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computing device 800.

In one embodiment, the storage device 818 or other computer-readable storage media is encoded with computer-executable instructions which, when loaded into the computing device 800, transform the computer from a general-purpose computing system into a special-purpose computer capable of implementing the embodiments described herein. These computer-executable instructions transform the computing device 800 by specifying how the CPUs 804 transition between states, as described above. According to one embodiment, the computing device 800 has access to computer-readable storage media storing computer-executable instructions which, when executed by the computing device 800, perform the various processes described above with regard to FIG. 6. The computing device 800 can also include computer-readable storage media having instructions stored thereupon for performing any of the other computer-implemented operations described herein.

The computing device 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computing device 800 might not include all of the components shown in FIG. 8, can include other components that are not explicitly shown in FIG. 8, or might utilize an architecture completely different than that shown in FIG. 8.

While the invention is described with respect to specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least in part by a component resource manager of a network device and for provisioning a right-size capacity of a local resource for the network device, the method comprising:

determining, that a utilization volatility period is beginning, wherein the utilization volatility period is a period of time during which a chance of a utilization increase of the local resource is within a predetermined threshold;

determining, an upper capacity boundary trigger and a lower capacity boundary trigger for the utilization volatility period;

receiving, from an auto energizing infrastructure, an expected utilization of the local resource for the network device during a utilization volatility period;

receiving, from the auto energizing infrastructure, a calculation of a maximum potential capacity delta for the expected utilization of the local resource for the network device during the utilization volatility period, wherein the maximum potential capacity delta is an amount of capacity of the local resource to cover a spike in utilization of the local resource above the expected utilization of the local resource; and algorithmically self-tune a right-size capacity of the local resource by increasing or decreasing a number of energized hardware elements providing incremental capacity during a duration of the spike based at least in part on whether local resource utilization telemetry for the network device indicates that the upper capacity boundary trigger or the lower capacity boundary trigger has been breached, wherein the right-size capacity is at least an amount of the local resource needed to ensure proper network functioning.

2. The method of claim 1, further comprising receiving, from a network controller, an acceptable failure rate for the maximum potential capacity delta, the acceptable failure rate based at least in part on current local traffic conditions.

3. The method of claim 1, wherein the maximum potential capacity delta is a maximum local resource capacity measurement increase expected during a sliding period of time having a duration equal to a capacity increase latency, wherein the capacity increase latency is an amount of time between a last measurement of capacity of the local resource that does not exceed a change in capacity trigger and a first measurement after capacity change has been instituted following a first measurement that exceeds the change in capacity trigger.

4. The method of claim 1, further comprising:
receiving local resource utilization telemetry for the network device,
based at least in part on the utilization telemetry, determining if an upper capacity boundary has been breached, or a lower capacity boundary has been breached and for a predetermined amount of time capacity measurements are below the lower capacity boundary;
in response to determining the upper capacity boundary has been breached, increase capacity of the local resource for the network device; and
in response to determining the lower capacity boundary has been breached and for the predetermined amount of time capacity measurements are below the lower capacity boundary, decrease capacity of the local resource for the network device.

5. The method of claim 1, wherein the expected utilization of the local resource for the network device during a utilization volatility period is determined using a time series forecasting model and is based at least in part on local network conditions.

6. The method of claim 1, wherein the right-size capacity of a local resource is at least equal to a predetermined minimum amount of capacity.

7. The method of claim 1, wherein determining the right-size capacity of the local resource for the utilization volatility period if further based on a local configuration change.

8. A system comprising:
one or more processors; and
one or more computer-readable media storing computer-executable instructions that, when executed by the one or more processors, cause the one or more processors to perform operations comprising:
determining, that a utilization volatility period for is beginning, wherein the utilization volatility period is a period of time during which a chance of a utilization increase of a local resource is within a predetermined threshold;
determining, an upper capacity boundary trigger and a lower capacity boundary trigger for the utilization volatility period;
receiving, from an auto energizing infrastructure, an expected utilization of the local resource for a network device during a utilization volatility period;
receiving, from the auto energizing infrastructure, a calculation of a maximum potential capacity delta for the expected utilization of the local resource for the network device during the utilization volatility period, wherein the maximum potential capacity delta is an amount of capacity of the local resource to cover a spike in utilization of the local resource above the expected utilization of the local resource; and
algorithmically self-tune a right-size capacity of the local resource by increasing or decreasing a number of energized hardware elements providing incremental capacity during a duration of the spike based at least in part on whether local resource utilization telemetry for the network device indicates that the upper capacity boundary trigger or the lower capacity boundary trigger has been breached, wherein the right-size capacity is at least an amount of the local resource needed to ensure proper network functioning.

9. The system of claim 8, the operations further comprising receiving, from a network controller, an acceptable failure rate for the maximum potential capacity delta, the acceptable failure rate based at least in part on current local traffic conditions.

10. The system of claim 8, wherein the maximum potential capacity delta is a maximum local resource capacity measurement increase expected during a sliding period of time having a duration equal to a capacity increase latency, wherein the capacity increase latency is an amount of time between a last measurement of capacity of the local resource that does not exceed a change in capacity trigger and a first measurement after capacity change has been instituted following a first measurement that exceeds the change in capacity trigger.

11. The system of claim 8, the operations further comprising:
receiving local resource utilization telemetry for the network device, based at least in part on the utilization telemetry, determining if an upper capacity boundary has been breached, or a lower capacity boundary has been breached and for a predetermined amount of time capacity measurements are below the lower capacity boundary;
in response to determining the upper capacity boundary has been breached, increase capacity of the local resource for the network device; and
in response to determining the lower capacity boundary has been breached and for the predetermined amount of time capacity measurements are below the lower capacity boundary, decrease capacity of the local resource for the network device.

12. The system of claim 8, wherein the expected utilization of the local resource for the network device during a utilization volatility period is determined using a time series forecasting model and is based at least in part on local network conditions.

13. The system of claim 8, wherein the right-size capacity of a local resource is at least equal to a predetermined minimum amount of capacity.

14. The system of claim 8, wherein determining the right-size capacity of the local resource for the utilization volatility period if further based on a local configuration change.

15. One or more non-transitory computer-readable media storing instructions that, when executed, cause one or more processors to perform operations comprising:
determining, that a utilization volatility period for is beginning, wherein the utilization volatility period is a period of time during which a chance of a utilization increase of a local resource is within a predetermined threshold;
determining, an upper capacity boundary trigger and a lower capacity boundary trigger for the utilization volatility period;
receiving, from an auto energizing infrastructure, an expected utilization of a local resource for a network device during a utilization volatility period;
receiving, from the auto energizing infrastructure, a calculation of a maximum potential capacity delta for the expected utilization of the local resource for the network device during the utilization volatility period, wherein the maximum potential capacity delta is an amount of capacity of the local resource to cover a spike in utilization of the local resource above the expected utilization of the local resource; and algorithmically self-tune a right-size capacity of the local resource by increasing or decreasing a number of energized hardware elements providing incremental capacity during a duration of the spike based at least in part on whether local resource utilization telemetry for the network device indicates that the upper capacity boundary or the lower capacity boundary trigger has been breached, wherein the right-size capacity is at least an amount of the local resource needed to ensure proper network functioning.

16. The one or more non-transitory computer-readable media of claim 15, the operations further comprising receiving, from a network controller, an acceptable failure rate for the maximum potential capacity delta, the acceptable failure rate based at least in part on current local traffic conditions.

17. The one or more non-transitory computer-readable media of claim 15, wherein the maximum potential capacity delta is a maximum local resource capacity measurement increase expected during a sliding period of time having a duration equal to a capacity increase latency, wherein the capacity increase latency is an amount of time between a last measurement of capacity of the local resource that does not exceed a change in capacity trigger and a first measurement after capacity change has been instituted following a first measurement that exceeds the change in capacity trigger.

18. The one or more non-transitory computer-readable media of claim 15, the operations further comprising:

receiving local resource utilization telemetry for the network device, based at least in part on the utilization telemetry, determining if an upper capacity boundary has been breached, or a lower capacity boundary has been breached and for a predetermined amount of time capacity measurements are below the lower capacity boundary;

in response to determining the upper capacity boundary has been breached, increase capacity of the local resource for the network device; and in response to determining the lower capacity boundary has been breached and for the predetermined amount of time capacity measurements are below the lower capacity boundary, decrease capacity of the local resource for the network device.

19. The one or more non-transitory computer-readable media of claim 15, wherein the expected utilization of the local resource for the network device during a utilization volatility period is determined using a time series forecasting model and is based at least in part on local network conditions.

20. The one or more non-transitory computer-readable media of claim 15, wherein the right-size capacity of a local resource is at least equal to a predetermined minimum amount of capacity.

* * * * *